United States Patent [19]
Williams, Jr.

[11] Patent Number: 5,529,011
[45] Date of Patent: Jun. 25, 1996

[54] CONNECTOR FOR UNDERWATER CABLES

[75] Inventor: Oneil J. Williams, Jr., Metairie, La.

[73] Assignee: Laitram Corporation, Harahan, La.

[21] Appl. No.: 394,325

[22] Filed: Feb. 23, 1995

Related U.S. Application Data

[63] Continuation-in-part of Ser. No. 200,704, Feb. 23, 1994.

[51] Int. Cl.⁶ ................................................... B63G 8/14
[52] U.S. Cl. .................. 114/245; 16/381; 59/95; 24/327
[58] Field of Search ........................... 114/243, 244, 114/245, 249; 24/327, 339, 340, 341, 351, 352; 16/257, 258, 380, 386, 381; 59/95

[56] References Cited

U.S. PATENT DOCUMENTS 3,013,297  12/1961  Ferry ................................. 16/381
3,648,642  3/1972  Fetrow et al. .
3,931,608  1/1976  Cole .
4,711,194  12/1987  Fowler .
4,879,719  11/1989  Dumestre, III .
5,214,612  5/1993  Olivier et al. .

Primary Examiner—Jesus D. Sotelo
Attorney, Agent, or Firm—Leydig, Voit & Mayer

[57] ABSTRACT

A connector for attaching equipment to an underwater cable includes a cylindrical race having a plurality of sections pivotably connected by a hinge. The sections can pivot about the hinge to enable the race to be opened and detached from the cable. The hinge includes a plurality of sockets and a hinge pin received in the sockets. The hinge pin can preferably be retracted from the sockets to unlock the hinge and inserted into the sockets to lock the hinge. A retaining member may be provided to prevent the hinge pin from falling out of the sockets when the hinge pin is retracted.

25 Claims, 12 Drawing Sheets

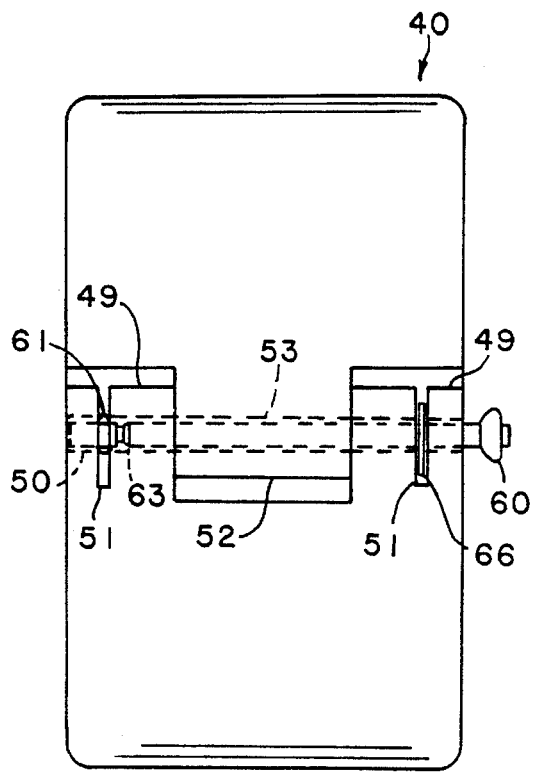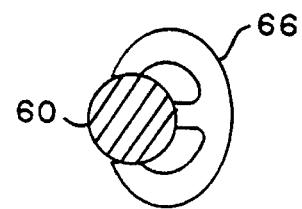
FIG. 7
FIG. 8
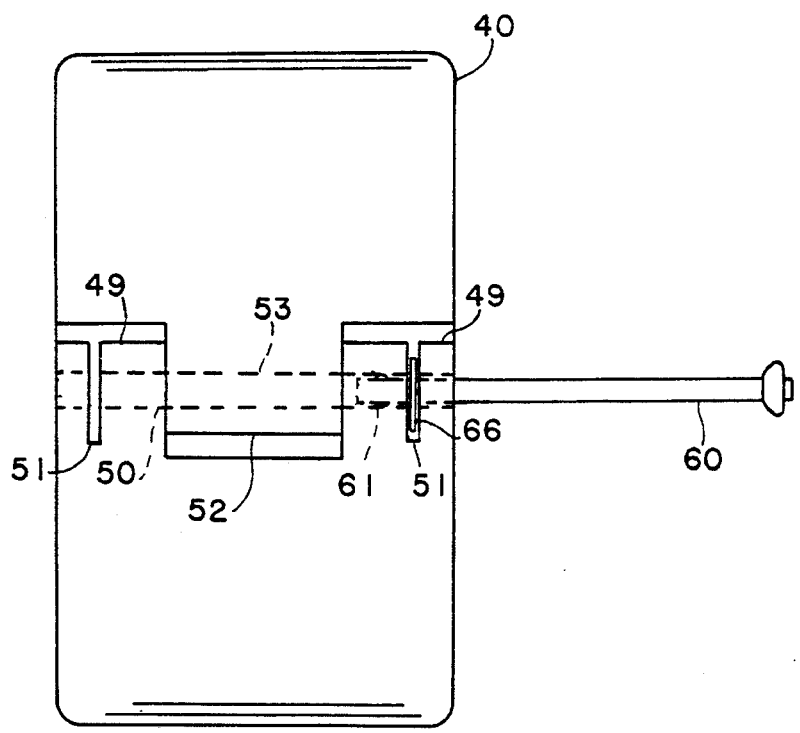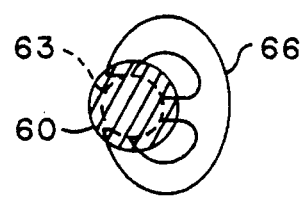
FIG. 9
FIG. 10

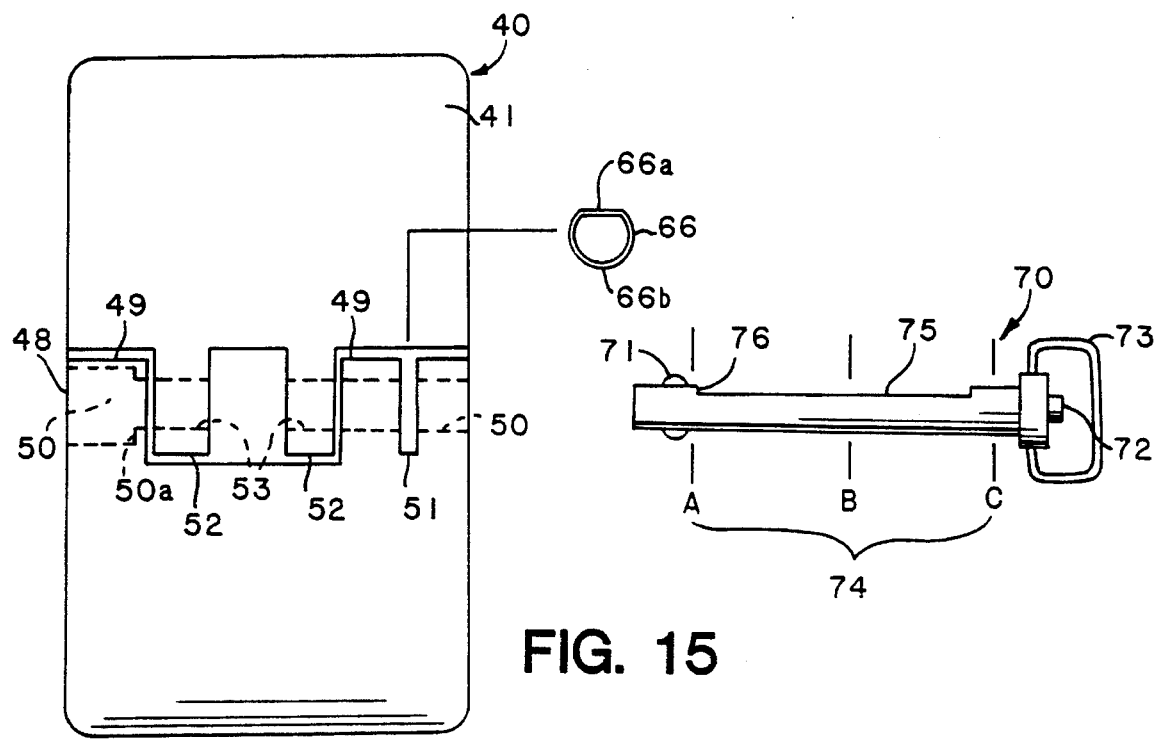
FIG. 15
FIG. 16A
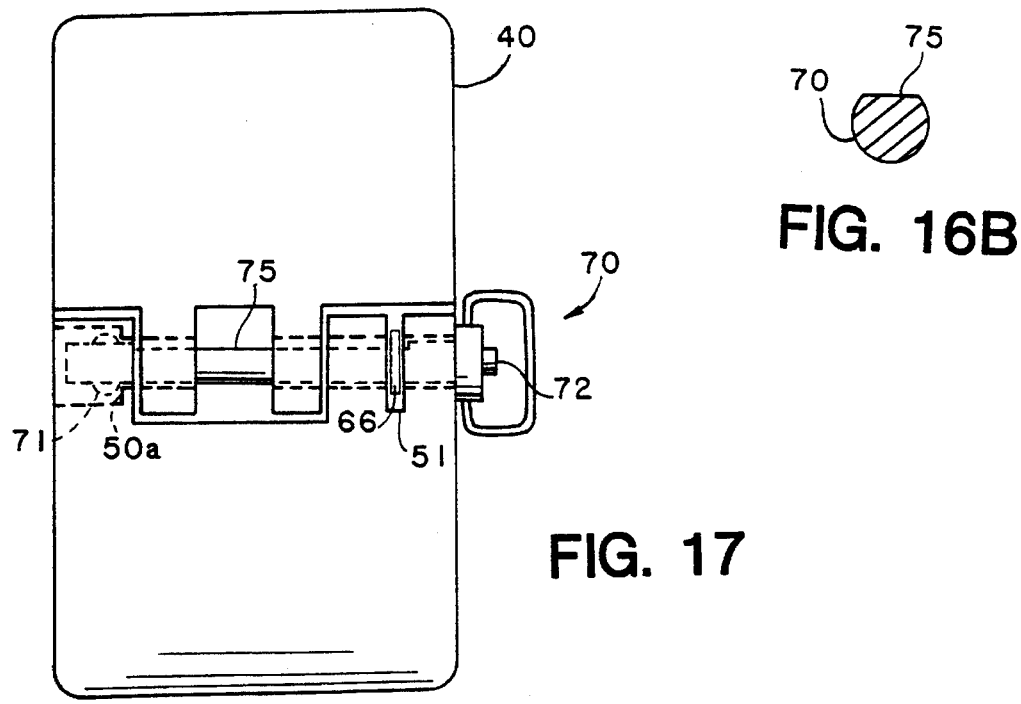
FIG. 16B
FIG. 17

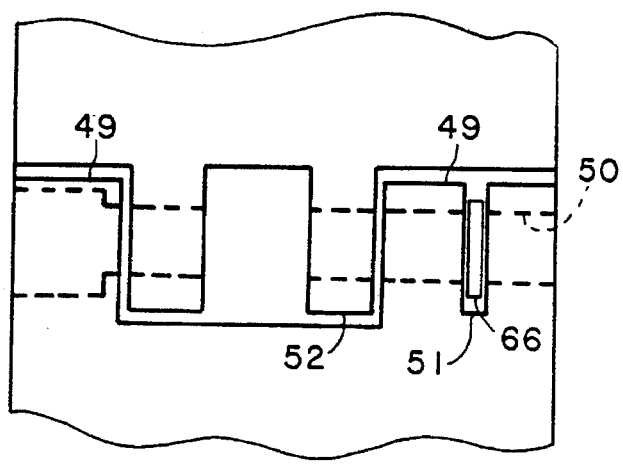
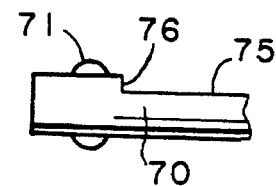
FIG. 18A
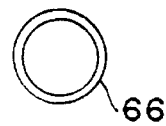
FIG. 18B
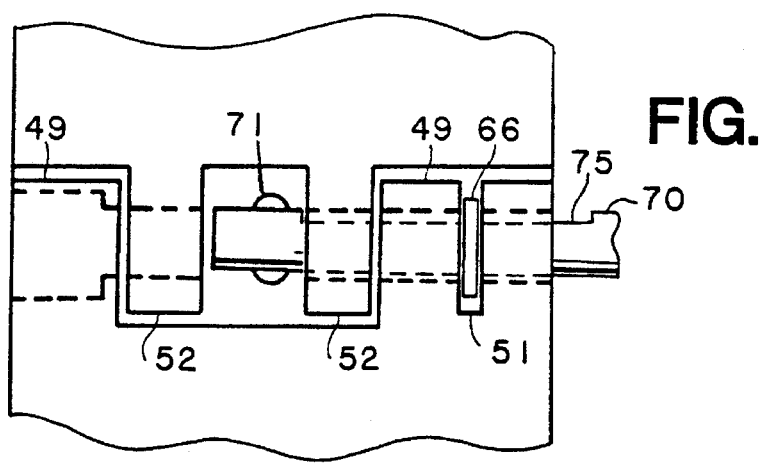
FIG. 18C
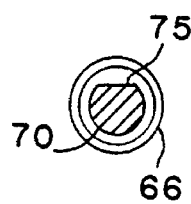 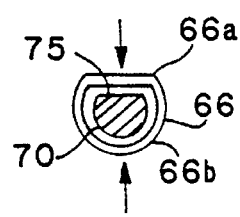 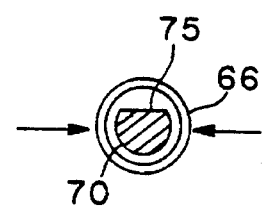
FIG. 18D    FIG. 18E    FIG. 18F

CONNECTOR FOR UNDERWATER CABLES

CROSS-REFERENCE TO RELATED APPLICATIONS

This application is a continuation-in-part of application Ser. No. 08/200,704 filed on Feb. 23, 1994.

BACKGROUND OF THE INVENTION

1. Field of the Invention

This invention relates to a connector for connecting equipment to underwater cables, such as underwater cables used in seismic testing. More particularly, it relates to a connector which makes it possible for equipment to be readily attached and detached from an underwater cable by hand without the need for any tools.

2. Description of the Related Art

In marine seismic exploration, a cable, commonly referred to as a streamer cable, is towed underwater by a surface vessel. An array of hydrophones is mounted in the cable, and an acoustic source or gun is fired to force an impulse of compressed air into the water, creating a bubble. The collapse of the bubble generates acoustic pulses that radiate through the water and into the earth. Reflections of the pulses off geologic structures are picked up by the hydrophones, and data representing the detected reflections are transmitted to the surface vessel. By analyzing the reflections, it is possible to discover subsea formations of oil or gas.

It is desirable to accurately control the depth of the cable as it is being towed through the water. For this purpose, depth control mechanisms, commonly referred to as "cable-leveling birds", are attached to the cable at intervals along its length. The depth control mechanisms are equipped with adjustable diving planes, the angles of attack of which can be varied by motors in the depth control mechanisms so as to maintain the cable at a desired depth.

Each depth control mechanism is detachably connected to the cable by one or more collar-shaped connectors, which are semipermanently attached to the cable. Attaching and detaching a depth control mechanism from a connector frequently entails the manipulation of one or more bolts or screws and requires the use of various tools such as a hex wrench or a screw driver. This makes the process of attaching and detaching the depth control mechanism time-consuming and difficult, especially on the deck of a rolling ship, and the difficulty increases with the severity of sea conditions. Once the depth control mechanism is detached from the cable, the cable with the collar-shaped connectors attached to it is typically wound up on a large reel. As layers of the cable accumulate on the reel, the connectors on the inner layers may be crushed against the cable, damaging the skin of the cable and/or the connector itself. Thus, conventional connectors for underwater cables have a number of problems with respect to ease of use. Often, a damaged outer section of the connector must be replaced. Attachment screws must be removed to separate the outer section of the connector. The removal of screws and their reinsertion in a replacement outer section require the use of tools and take time. Furthermore, after the screws are removed, they can easily become lost and washed overboard.

SUMMARY OF THE INVENTION

Accordingly, it is an object of the present invention to provide a connector which enables equipment to be easily attached and detached from an underwater cable without the need for any tools.

It is another object of the present invention to provide a connector with no loose parts which can become lost.

It is yet another object of the present invention to provide a connector which can be removed from a cable while still attached to the equipment which it supports.

It is still another object of the present invention to provide a method of installing a hinge pin on a connector for an underwater cable.

A connector for an underwater cable according to the present invention includes an inner race adapted for connection to a cable and an outer race rotatably mounted on the inner race. The outer race includes first and second sections pivotably connected by a hinge which enables the outer race to be opened by pivoting of the sections about the hinge, thereby allowing detachment of the outer race from the inner race. In a preferred embodiment, the two sections of the outer race are semicylindrical.

The outer race may also include a latch member for releasably latching the outer race to prevent the first and second sections from pivoting about the hinge. In a preferred embodiment, the latch member is a hinge having a retractable hinge pin.

In a preferred embodiment, the outer race has first and second hinges, with each hinge having a retractable hinge pin. The outer race can be opened by partially retracting either hinge pin from the corresponding hinge. Each hinge preferably includes a retaining member preventing the hinge pin from falling out of the hinge when it is partially retracted. When the hinge pins are fully inserted into the hinges, the sections of the outer race are held securely together.

The hinge pins are preferably of a quick release type such that they can be retracted from the hinges by hand without the need for any tools.

A connector according to the present invention is suitable for connecting a depth control mechanism to an underwater cable, but it is not restricted to use with a particular type of underwater equipment. For example, it can also be used to attach acoustic transceivers, flotation or ballasting equipment, or compass pods to an underwater cable. It can also be used to attach equipment to underwater cables other than those used in seismic exploration or to cables used outside of the water.

BRIEF DESCRIPTION OF THE DRAWINGS

FIG. 7 is a side view of the outer race in a locked state.

FIG. 8 is a cross-sectional view showing the relationship between the retaining member and the hinge pin in the state shown in FIG. 7.

FIG. 9 is a side of the outer race in an unlocked state.

FIG. 10 is a cross-sectional view showing the relationship between the retaining member and the hinge pin in the state shown in FIG. 9.

FIG. 15 is a side view of another embodiment of the present invention in a partially assembled state.

FIGS. 16A and 16B are cross-sectional views of different portions of the hinge pin of the embodiment of FIG. 15.

FIG. 17 is a side view of the embodiment of FIG. 15 as assembled.

FIGS. 18A–18F illustrate the mounting of the retaining ring of FIG. 15 on the hinge pin.

DESCRIPTION OF PREFERRED EMBODIMENTS

Figure 1:
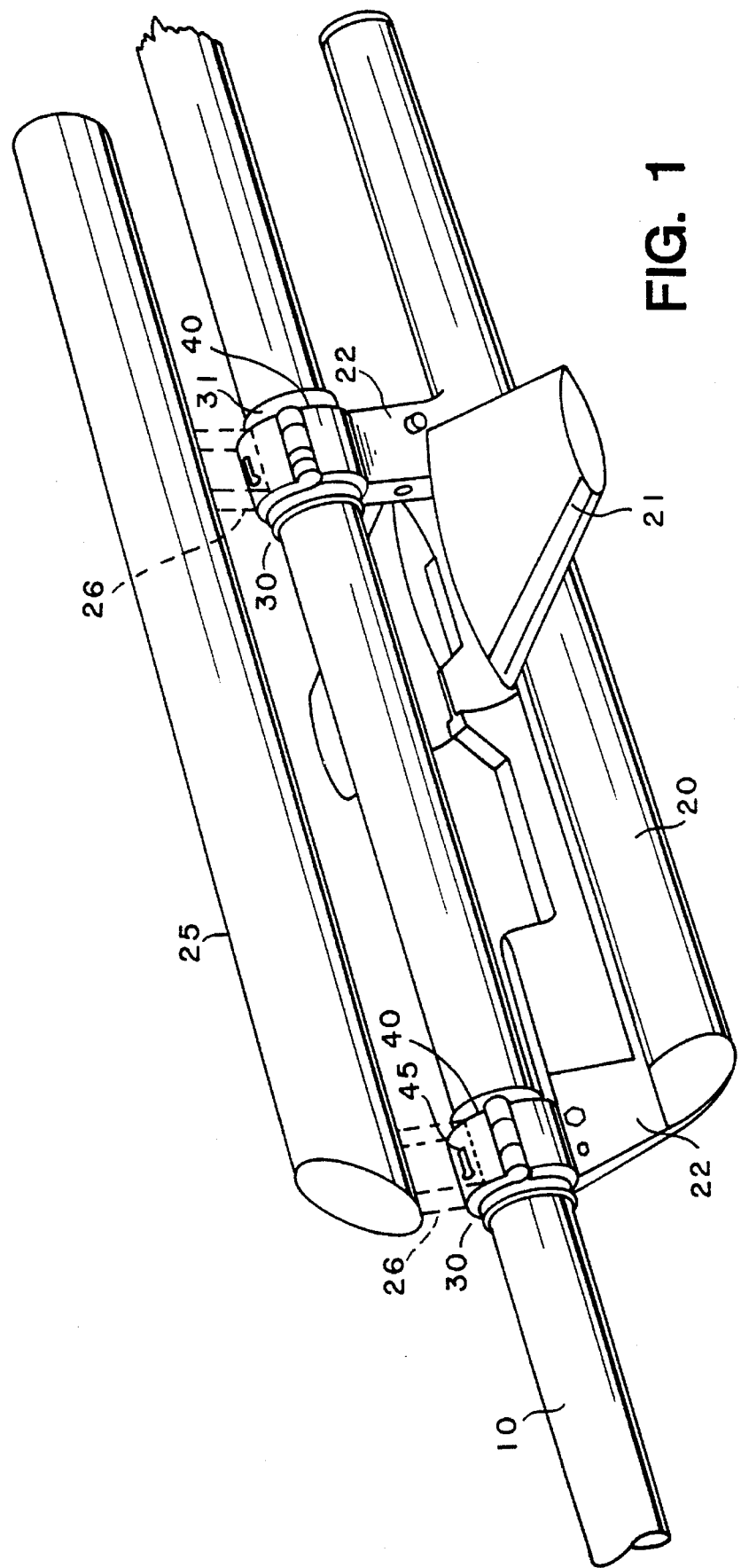
FIG. 1 is a perspective view of an embodiment of the present invention used in connecting a depth control mechanism to an underwater streamer cable.

FIG. 1 illustrates an embodiment of a connector 30 according to the present invention being used to connect one or more pieces of equipment in the form of a depth control mechanism 20 and a float tube 25 (just two examples of various types of equipment with which the present invention can be employed) to an underwater streamer cable 10. The cable 10 can be towed underwater to the left in the figure by an unillustrated surface vessel. Although FIG. 1 shows only a single depth control mechanism 20 and float tube 25, in actual practice, a plurality of depth control mechanisms 20 and other equipment, such as acoustic transceivers, are connected to the cable 10 at intervals along its length, which is sometimes up to several kilometers.

The depth control mechanism 20, which can be of conventional design, is equipped with adjustable diving planes 21, the angles of attack of which can be varied by an unillustrated motor housed inside the body of the depth control mechanism 20. Depth control mechanisms for use with underwater streamer cables are well-known to those skilled in the art, and the present invention is not restricted to use with any particular type. The depth control mechanism 20 also includes fore and aft pylons 22, each of which is detachably secured to a connector 30 of the present invention.

The float tube 25 is a sealed, hollow tube of PVC or the like which has positive buoyancy and is used to adjust the buoyancy of the cable 10. A float tube 25 may be attached to the cable 10 opposite a depth control mechanism 20 to provide buoyancy when the cable 10 is moving at low or zero speed and the lift generated by the depth control mechanism 20 is inadequate to overcome its weight. It may also be attached to the cable 10 opposite equipment such as an acoustic pod which generates no lift, or it may be attached to the cable 10 by itself between other pieces of equipment. The float tube 25 has fore and aft pylons 26, shown in phantom, which are detachably secured to the connectors 30 opposite from the pylons 22 of the depth control mechanism 20. Float tubes and their usage are well-known to those skilled in the art.

Each connector 30 has generally the shape of a cylinder surrounding the cable 10. The connectors 30 include a cylindrical inner collar, referred to as an inner race 31, which is clamped to the outer surface of the cable 10, and a cylindrical outer collar, referred to as an outer race 40, which surrounds the inner race 31 and can freely rotate about the inner race 31. Each pylon 22 and 26 is connected to one of the outer races 40 but not to the inner races 31. As a result, when the cable 10 is being towed through the water, the depth control mechanism 20 can hang beneath the cable 10 and the float tube 25 can float above the cable 10 without being affected by twisting of the cable 10.

Figure 2:
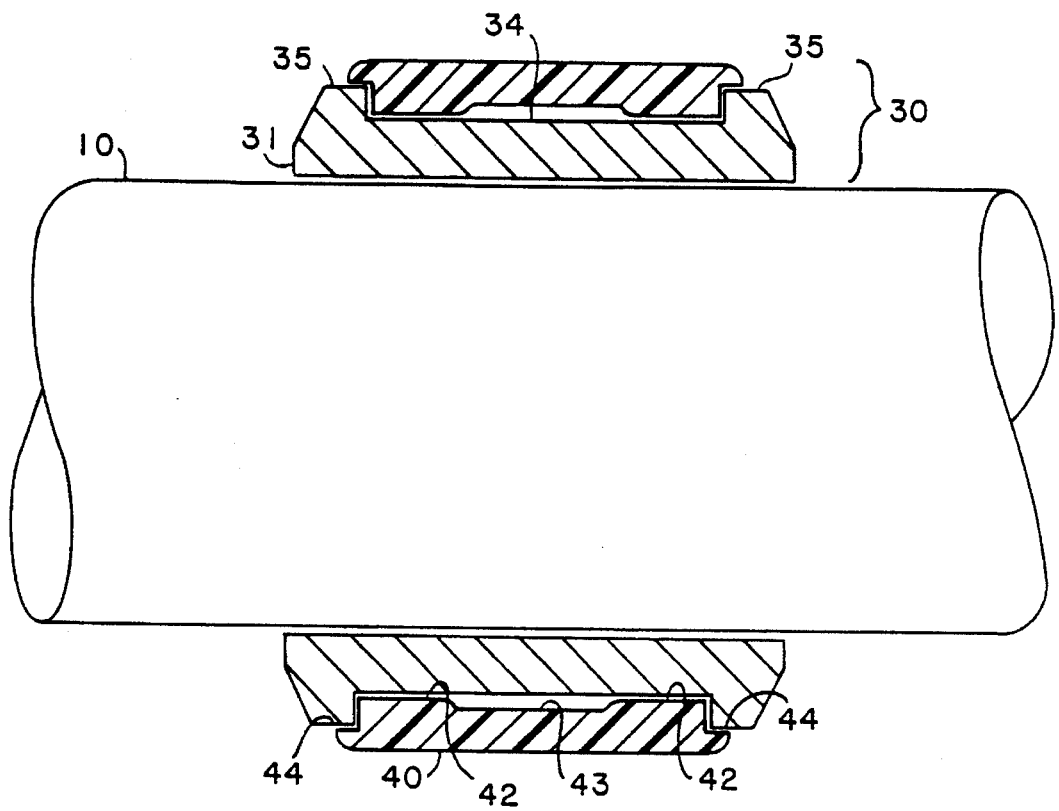
FIG. 2 is a longitudinal cross-sectional view of one of the connectors of FIG. 1.
Figure 3:
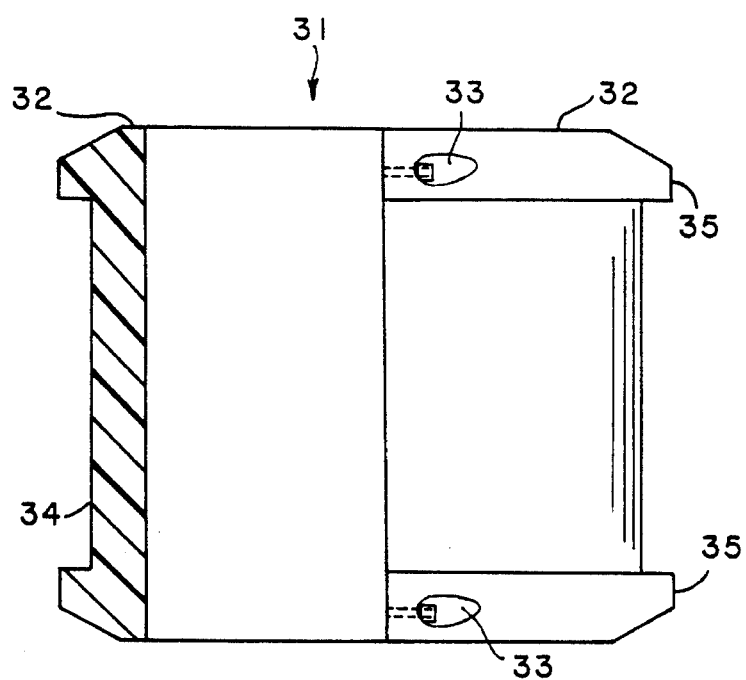
FIG. 3 is a partly cross-sectional elevation of the inner race of the connector of FIG. 2.

The inner race 31 can be identical in structure to the inner race of a conventional connector for an underwater cable. As shown in FIGS. 2 and 3, the inner race 31 comprises a plurality of arcuate sections which are combined to define a generally tubular shape with a cylindrical bore for receiving the cable 10. In the present embodiment, the inner race 31 comprises two semicylindrical sections 32 held together by screws 33 or other suitable means. The inner race 31 is connected to the cable 10 so as not to slide along the length of the cable 10 during use. For example, the inner race 31 can be cemented to the outer surface of the cable 10, or taped or other members may be attached to the cable 10 near the ends of the inner race 31 to define stops which prevent the inner race 31 from moving longitudinally along the cable 10 when subjected to drag forces. Alternatively, the inner diameter of the inner race 31 may be selected so that when the two sections 32 are combined, the cable 10 is tightly clamped between the sections 32 without the cable 10 being damaged.

On its outer periphery, the inner race 31 has a cylindrical bearing surface 34 for rotatably supporting the outer race 40. Two cylindrical flanges 35 each having a larger outer diameter than the bearing surface 34 are formed at the longitudinal ends of the bearing surface 34. The flanges 35 define stops which limit the axial movement of the outer race 40 when it is mounted on the inner race 31. While the flanges 35 need not have any specific shape, preferably they have no sharp corners on their outer peripheries which could catch against objects underwater.

Figure 4A:
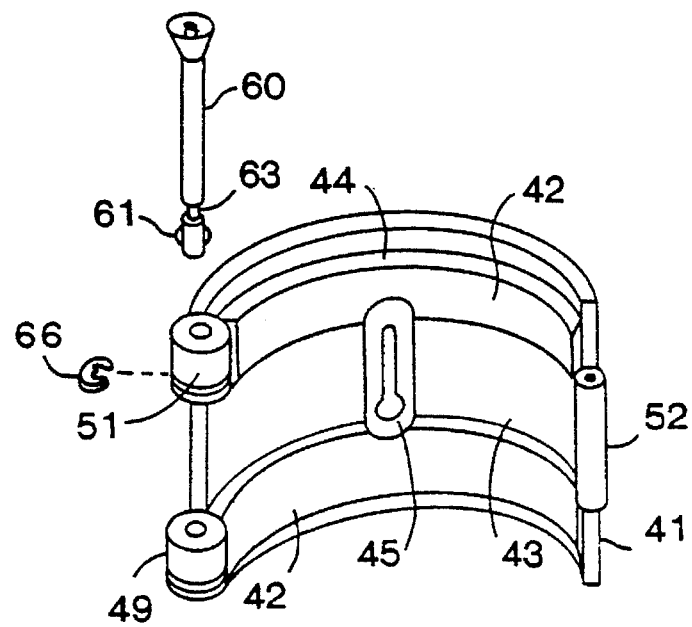
FIG. 4 is a perspective view of the outer race of the connector of FIG. 2 in a disassembled state.
Figure 4B:
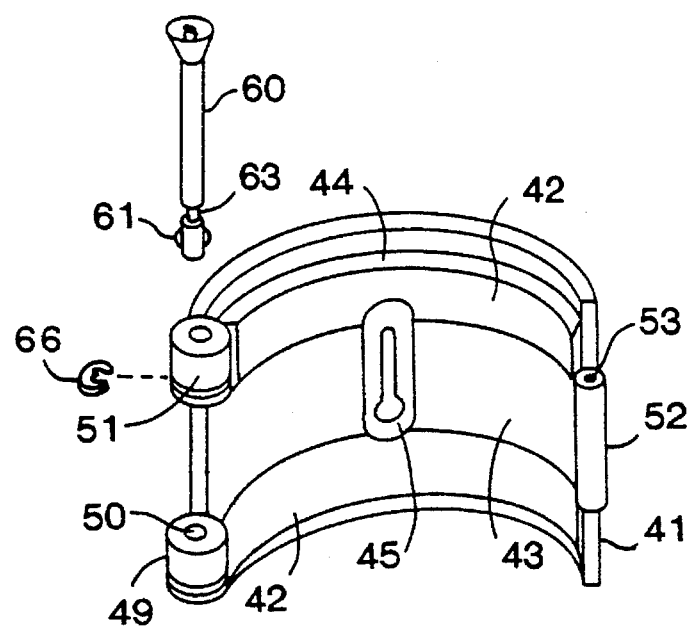
Figure 5:
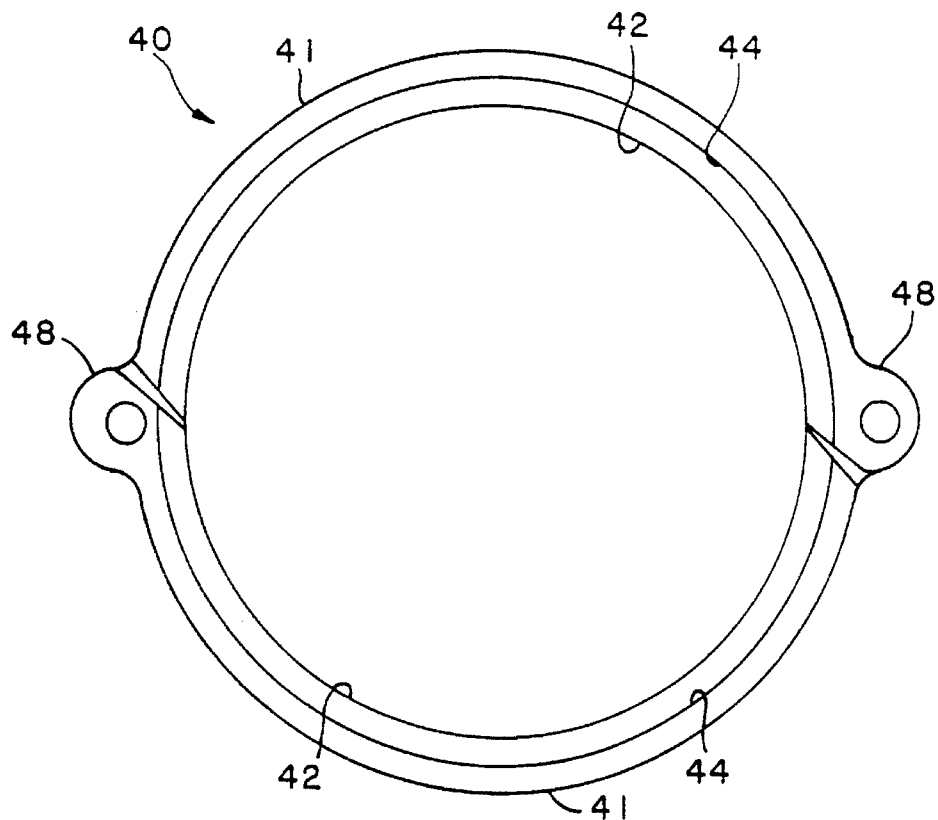
FIG. 5 is an end view of the outer race of FIG. 4 in an assembled state.

FIG. 4 illustrates the outer race 40 in a disassembled state. It comprises a plurality of arcuate sections connected together by one or more hinges 48 which enable the outer race 40 to be opened and closed. As described below, each hinge 48 can function either as a hinge about which the sections of the outer race 40 can pivot, or as a releasable latch member which can be latched to prevent relative movement of the sections or unlatched to allow the pivoting movement of the sections of the outer race 40. In this embodiment, the outer race 40 comprises two identical semicylindrical sections 41 which can be combined as shown in FIG. 5 to form a cylinder. Each section 41 has a pair of raised semicylindrical lands 42 extending between its lengthwise ends. The lands 42 are dimensioned so as to fit loosely around the bearing surface 34 of the inner race 31. The two lands 42 of each section 41 are separated by a semicylindrical recess 43. A circumferentially extending step 44 is formed in each section 41 on the widthwise outer side of each land 42. As shown in FIG. 2, when the outer race 40 is fit over the inner race 31, each step 44 overlaps in the axial direction one of the flanges 35 of the inner race 31 and helps to prevent dirt and other trash from entering between the bearing surface 34 of the inner race 31 and the lands 42 of the outer race 40, thus assuring that the two races 31 and 40 can smoothly rotate with respect to one another. However, for ease of manufacture, the steps 44 may be omitted.

The outer periphery of the outer race 40 need not be of any particular shape, but preferably it is without sharp corners which could increase flow resistance or easily catch on objects in the water. In the present embodiment, the outer surface of the outer race 40 is cylindrical.

Hinge sockets 49 and 52 are formed on the lengthwise ends of the sections 41. When the two sections 41 combine, the sockets interfit to define two diametrically opposed hinges 48. The number of sockets which are employed for each hinge 48 is not critical, and in the present embodiment, each hinge 48 includes three sockets. Two outer sockets 49 are formed on one end of each section 41 of the outer race 40 adjoining its widthwise sides, while an inner socket 52 is formed on the opposite end of the section 41 at approximately the widthwise center of the section 41. Axial bores 50 and 53 for receiving a hinge pin 60 are formed through the entire lengths of the outer sockets 49 and the inner sockets 52, respectively. When the two sections 41 are combined, the bores 50 in the outer sockets 49 of one section 41 align with the bore 53 of the inner socket 52 of the other section 41.

Each of the outer sockets 49 has an engaging portion in the form of an annular groove 51 extending from the outer surface of the socket 49 to its bore 50. A retaining member 66 such as an E-type retaining ring or a hairclip pin is housed in the groove 51 of either one of the outer sockets 49 of each section 41.

Figure 6:
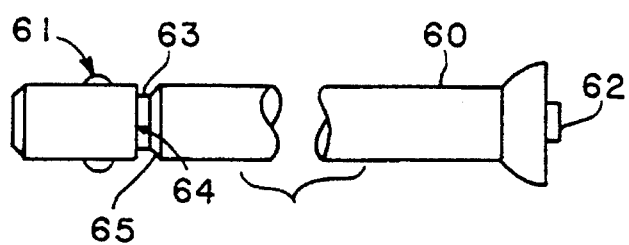
FIG. 6 is a plan view of one of the hinge pins of the outer race of FIG. 4.

The inner and outer sockets of the two hinges 48 of the outer race 40 are pivotably connected to one another by means of a retractable hinge pin 60, such as the one illustrated in FIG. 6. The hinge pins 60 employed in this embodiment are push-button quick release pins. Each hinge pin 60 has a detent mechanism comprising a pair of spring-loaded detent balls 61 disposed near one end and biased in the radially outward direction of the pin 60. The detent balls 61 are intended to engage with the groove 51 of the outer socket 49 not containing the retaining member 66. The detent balls 61 can be retracted radially inward by manually depressing a button 62 installed on the other end of the pin 60. Quick release pins which have a detent mechanism of this type and which can be modified in accordance with the present invention are commercially available from various sources, such as McMaster-Carr Corporation of Chicago, Ill.

A circumferential groove 63 extends around the entire outer periphery of the pin 60 between the detent balls 61 and the button 62 and in the vicinity of the detent balls 61. The groove 63 has a first wall 64 formed in a plane substantially perpendicular to the axis of the pin 60, and a second wall 65 which slopes away from the first wall 64. The groove 63 is intended to engage with one of the retaining members 66. The second wall 65 can have any shape which enables the retaining member 66 to disengage from the groove 63 by sliding along the second wall 65. In this embodiment, the second wall 65 is frustoconical with a constant slope, but it can also have a curved slope, for example.

The connector 30 can be made of any materials having a strength and corrosion resistance suitable for an underwater environment. Examples of suitable materials for the inner and outer races include plastics such as amorphous resins and PVC, and metals such as stainless steel or cast aluminum. Commercially available quick release pins suitable for use as the hinge pins 60 are frequently made from stainless steel.

The inner and outer races 31 and 40 of this embodiment are each formed from two semicylindrical sections. However, each race can include a larger number of sections. Accordingly, the outer races 40 need not have two hinges 48. For example, the outer race 40 could comprise three arcuate sections connected to one another by three hinges.

FIG. 7 illustrates the outer race 40 in an assembled and locked state. In this state, the bores of the inner and outer sockets of adjoining sections 41 are aligned, and each hinge pin 60 is inserted into the aligned bores of a hinge 48 until the detent balls 61 engage the groove 51 in one of the outer sockets 49. Once the detent balls 61 and the groove 51 are engaged, the outward biasing force exerted on the detent balls 61 by the biasing spring of the hinge pin 60 is sufficiently strong that the hinge pin 60 will not be forced out of the hinge sockets by forces encountered during underwater operation of the connector 30.

When the outer race 40 is installed on a cable 10, the hinge pin 60 is preferably oriented such that the end equipped with the button 62, which protrudes to the outside of the outer race 40, is on the aft side of the outer race 40 to prevent fishing lines, seaweed, or other trash from catching on the hinge pin 60. For the same reason, the length of the hinge pin 60 is preferably such that the end opposite the button 62 does not project from the forward side of the outer race 40.

The retaining member 66 disposed inside the groove 51 of the other outer socket 49 of each hinge 48 surrounds the hinge pin 60 and engages a portion of the hinge pin 60 outside the groove 63. FIG. 8 illustrates the retaining member 66 when the outer race 40 is in the locked state. Although the retaining member 66 is frictionally engaged with the hinge pin 60, the outer surface of the hinge pin 60 is sufficiently smooth that the retaining member 66 does not prevent the axial movement of the hinge pin 60.

When it is desired to open the outer race 40, the button 62 of the hinge pin 60 is depressed to retract the detent balls 61 inward and disengage them from the groove 51. With the detent balls 61 retracted, the hinge pin 60 can be moved to the right in FIG. 9 until the groove 63 in the hinge pin 60 is aligned with the groove 51 in the outer socket 49 containing the retaining member 66, upon which the retaining member 66 engages with the groove 63 in the hinge pin 60. The hinge pin 60 at the time of engagement is shown in cross section in FIG. 10. The first wall 64 of the groove 63 is shaped so that it abuts against the side of the retaining member 66, and further outward movement, i.e., rightward movement of the hinge pin 60 is prevented by the retaining member 66. In this state, the left end of the hinge pin 60 is located outside of the inner socket 52, so the inner and outer sockets of the illustrated hinge 48 can separate to allow the outer race 40 to be opened. At this time, the hinge pin 60 of the other hinge 48 on the opposite side of the outer race 40 remains in its locked position, so as the outer race 40 is opened, the sections 41 pivot about the other hinge pin 60.

When the outer race 40 is closed, it can be relocked by pushing the hinge pin 60 to the left in FIG. 9 until it returns to the position shown in FIG. 7 and the detent balls 61 once again engage with the groove 51 in one of the outer sockets 49. Since the second wall 65 of the groove 63 in the hinge pin 60 is sloped, as the hinge pin 60 is pushed to the left in FIG. 9, the retaining member 66 can ride up the second wall 65 and out of the groove 63. Thus, the groove 63 and the retaining member 66 prevent movement of the hinge pin 60 in a single direction. Namely, they prevent complete retraction of the hinge pin 60 from the outer race 40 but do not prevent insertion.

It can be seen that either hinge 48 can function as a hinge about which the two sections 41 of the outer race 40 can pivot, or it can serve as a releasable latch member for locking and unlocking the two sections 41 from one another to prevent or allow them to pivot with respect to each other while the other hinge 48 functions as a hinge. Since the two hinges 48 are identical in structure, which one is used as a latch member and which one is used as a hinge can be decided by the user of the connector 30 in accordance with his convenience.

The hinge pin 60 is not restricted to any particular type, and any pin having detent members which can be controllably engaged and disengaged from the grooves 51 in the outer sockets 49 can be employed. The grooves 51 need not extend to the outer surface of the outer sockets 49. For example, the grooves 51 which receive the detent balls 61 could be replaced by a recess formed in the bores 50 of the outer sockets 49 and not extending to the outside of the sockets 49. However, grooves 51 extending between the inner and outer surfaces of the outer sockets 49 are advantageous in that they are easy to form and make it easy to install the retaining members 66.

The outer race 40 can be connected to the depth control mechanism 20 and the float tube 25 by any means which does not interfere with the relative rotation of the inner and outer races and which can withstand the forces applied to devices 20 and 25 during use. In the present embodiment, the depth control mechanism 20 is releasably connected to the outer race 40 by engagement between a slot formed in the outer race 40 and a coupling device on the depth control mechanism 20. As shown in FIG. 4, each of the sections 41 of the outer race 40 has a keyhole-shaped slot 45 formed therein with an axis extending in the axial direction of the outer race 40. If the outer race 40 is to be connected to only a single piece of equipment, such as a depth control mechanism 20, a single slot 45 is sufficient. However, in this embodiment each section 41 of the outer race 40 has its own slot 45 so that the two sections 41 are identical in structure and can be used interchangeably and so that the outer race 40 can be connected to more than one piece of equipment at a time. Each slot 45 has a generally straight portion 46 and a generally circular enlarged portion 47 having a diameter greater than the width of the straight portion 46. Each slot 45 opens onto the outer peripheral surface of the outer race 40, i.e., the surface facing away from the inner race 31. While it is not necessary for the slot 45 to extend to the inner peripheral surface of the outer race 40, for ease of manufacture, it is generally simpler to form the slots 45 as through holes extending through the thickness of each section 41 of the outer race 40. When the outer race 40 is mounted on a cable 10, the straight portion 46 of the slot 45 is preferably disposed aft of-the enlarged portion 47.

Figure 11:
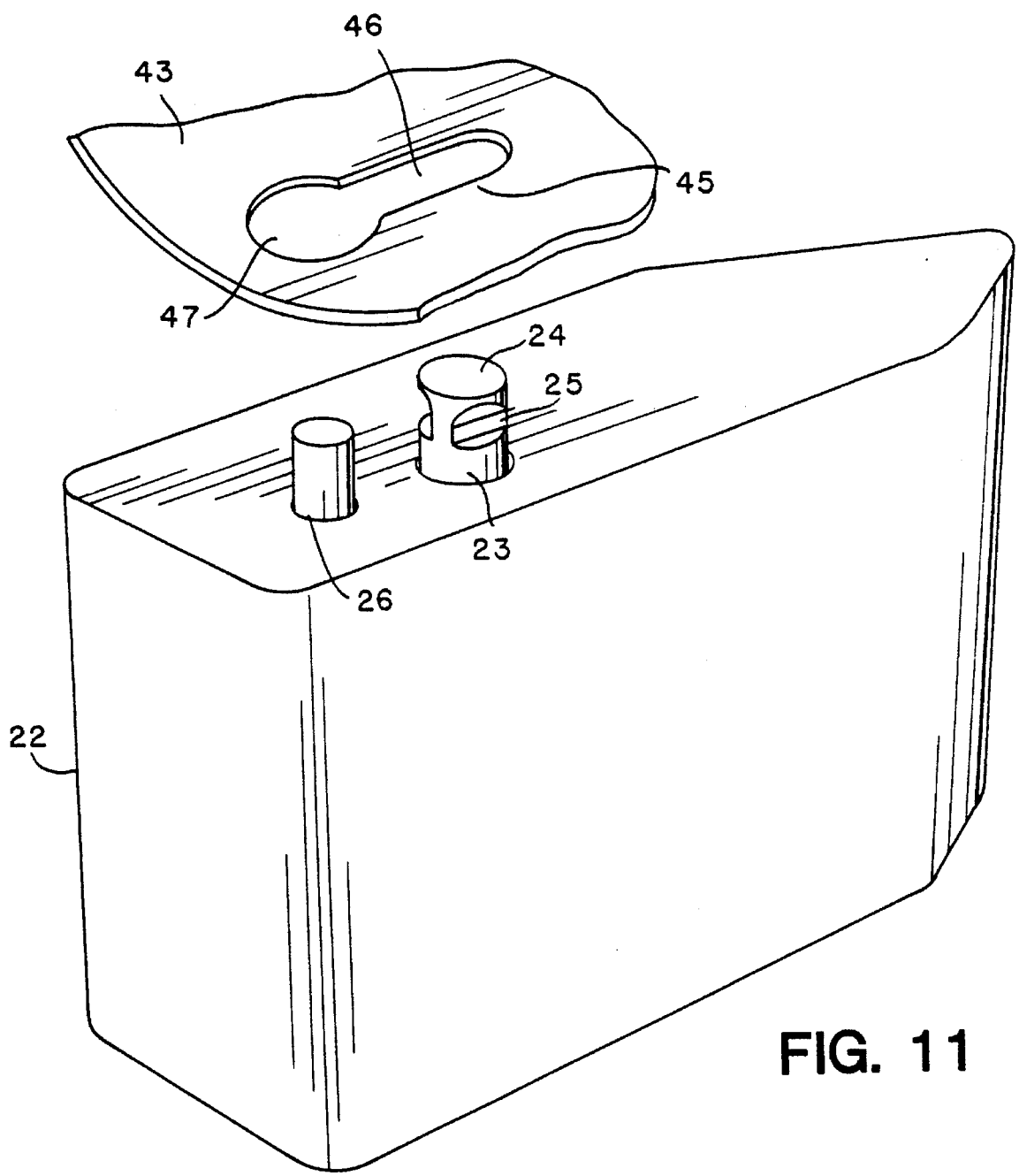
FIG. 11 is a perspective view showing a typical arrangement for connecting the depth control mechanism to the outer race of the connector.

As schematically shown in FIG. 11, the upper end of each pylon 22 of the depth control mechanism 20 is equipped with a coupling device of a well-known design. The coupling device includes first and second pins 23 and 26 which engage with one of the slots 45 in the outer race 40. The first pin 23 has a head 24 having a diameter smaller than the diameter of the enlarged portion 47 of the slot 45 but larger than the width of the straight portion 46 of the slot 45. Notches 25 capable of engaging with the sides of the straight portion 46 of the slot 45 are formed in the first pin 23 beneath its head 24. The first pin 23 can be inserted into the enlarged portion 47 of the slot 45 and then moved in the axial direction of the slot 45 away from the enlarged portion 47 to engage the notches 25 with the straight portion 46 of the slot 45. Once the notches 25 are engaged with the straight portion 46, the first pin 23 can not be removed from the slot 45 without first sliding the first pin 23 back to the enlarged portion 47. The second pin 26 is spring biased away from the upper end of the pylon 22. When the first pin 23 has been inserted into the enlarged portion 47 and then slid into the straight portion 46 of the slot 45, the second pin 26 pops into the enlarged portion 47 of the slot 45 and prevents the first pin 23 from coming out of the slot 45. The second pin 26 can be retracted from the slot 45 by an unillustrated operating lever to enable the first pin 23 to be withdrawn from the slot 45 when desired. The illustrated coupling device is the same as that described in detail in U.S. Pat. No. 5,214,612, and other features of the structure of the coupling device can be found by reference to that patent. However, a variety of coupling devices for connecting equipment to a keyhole-shaped slot in an outer race of a connector are widely known, and any of those known devices can be employed in the present invention. The pylons 26 of the float tube 25 can be connected to the outer races 40 by means of a similar structure.

While the embodiment of FIG. 1 employs a conventional slot and pin-type arrangement for connecting the depth control mechanism 20 and the float tube 25 to the outer race 40 of each connector 30, other means can be employed. With a conventional connector, the outer race is not readily detachable from the inner race, so it is important that equipment such as the depth control mechanism 20 and the float tube 25 be readily detachable from the outer race. However, in the present invention, since the outer race 40 can be readily detached from the inner race 31, it is not important that the depth control mechanism 20 or the float tube 25 be readily detachable from the outer race 40. Therefore, in the present invention, coupling devices less complicated and easier to manufacture than that shown in FIG. 11 can be used to connect the depth control mechanism 20 and the float tube 25 to the outer race 40. For example, the outer race 40 can be connected to the depth control mechanism 20 and the float tube 25 by screws or bolts.

When the depth control mechanism 20 or the float tube 25 needs to be removed from the cable 10 aboard the deck of a ship, an operator can release the outer race 40 of each connector 30 by retracting one of the hinge pins 60 of each outer race 40. Since both hinge pins 60 of each connector 30 are retractable, it is easy for an operator to open the outer races 40, regardless of which side of the cable 10 he is standing on. Once the hinge pins 60 are retracted, the outer races 40 can be opened and the depth control mechanism 20 and the float tube 25 detached from the cable 10. At this time, the retracted hinge pins 60 are still attached to the outer races 40 by the retaining members 66 in the grooves 51 of the outer races 40, so there is no danger of the hinge pins 60 coming loose and being lost. In addition, when the outer races 40 are removed from the inner races 31, they can remain attached to the depth control mechanism 20 and the float tube 25, so there is no danger of the outer races 40 falling off and rolling around the deck of the ship. Attachment and removal of the outer race 40 can be performed by hand without the need for any tools, resulting not only in earlier installation but less risk of tools being washed overboard.

With a conventional arrangement, the depth control mechanism 20 and the float tube 25 would have to be individually removed from a connector in order to detach them from a cable. However, in the present embodiment, both devices 20 and 25 can be simultaneously detached from the cable 10 in a single operation, increasing the speed of operation. In the past, it was necessary to stop the cable in order to detach equipment from it, but the outer race 40 of a connector 30 according to the present invention along with equipment 20 and 25 attached thereto can be detached from a moving cable 10 as it is being reeled in.

Instead of using retaining members 66, it is possible to employ engagement between the detent balls 61 and one of the grooves 51 in the outer sockets 49 to prevent the hinge pins 60 from falling out of the sockets when the hinge pins 60 are in a retracted state. Alternatively, a chain, string, or similar device could be attached between each hinge pin 60 and the corresponding outer race 40 and function as a retaining member to prevent the hinge pin 60 from becoming lost.

Prior to using the cable 10 aboard ship, the inner races 31 are mounted on the cable 10 at suitable intervals, and then the cable 10 is coiled for storage. The outer races 40 are attached to the equipment which is to be towed by the cable 10. When the cable 10 is deployed, it is uncoiled, and as it is fed overboard, the outer races 40 attached to the equipment to be towed are locked around the corresponding inner races 31. When the cable 10 is reeled back in, the equipment being towed and the outer races 40 are together detached from the inner races 31, and the cable 10 is again coiled. With a conventional connector, both the inner race and the outer race remain attached to the cable 10 when it is coiled. However, in the present invention, the outer race 40 is removed from the cable 10 along with the equipment being towed by the cable 10, leaving only the inner race 31 attached to the cable 10. Therefore, a cable 10 employing a connector according to the present invention is easier to coil and store. Furthermore, when the outer races 40 are removed, they are less subject to damage than if the cable 10 were coiled with the outer races 40 still attached. In addition, there is less possibility of damage by the connectors 30 to the skin of the cable 10 during coiling if the outer races 40 are first removed.

It is generally desirable for the depth control mechanism 20 and the float tube 25 to be able to freely rotate with respect to the cable 10, so the connector 30 will usually include an inner race 31 to provide a smooth bearing surface for the outer race 40. However, if the equipment being towed is not of a type that needs to be able to rotate about the cable 10, the inner race 31 can be dispensed with, and the outer race 40 can be installed directly on the cable 10.

Since the illustrated embodiment employs a conventional arrangement for connecting the outer race 40 to equipment being towed, a conventional underwater cable connector can be easily retrofit to obtain a connector according to the present invention by replacing the outer race of an existing cable connector with an outer race like that of the illustrated embodiment.

It is not necessary that both of the hinges 48 have an easily retractable hinge pin 60. For example, if the hinge pin of one hinge 48 is retractable to enable that hinge 48 to function as a latch member, the hinge pin of the other hinge 48 may be of a type requiring use of a tool to remove it from the hinge 48. Furthermore, one of the hinges 48 can be replaced by a latching member of a type which does not function as a hinge.

Figure 12:
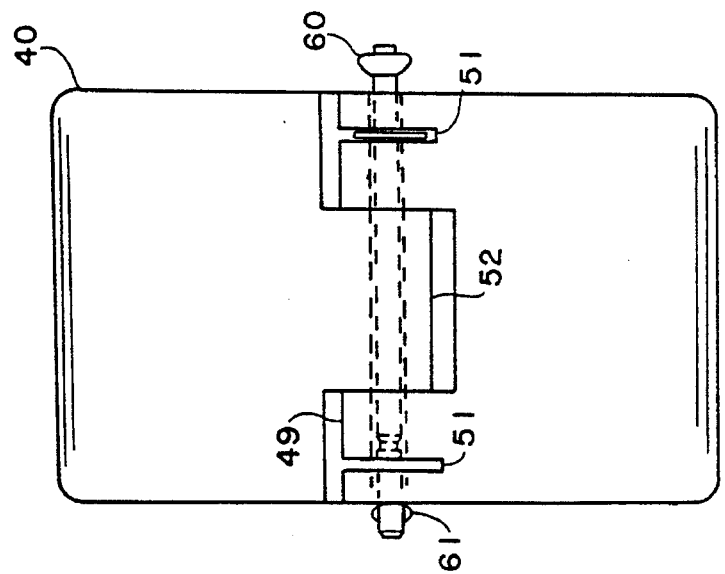

The detent balls 61 of the hinge pin 60 need not be engaged with one of the grooves 51 when the outer race 40 is in a locked state, and may engage with any portion of the outer race 40 such that the axial movement of the hinge pin 60 is prevented. For example, FIG. 12 shows the outer race 40 of an embodiment in which the detent balls 61 engage with an exterior surface of the outer race 40 when the outer race 40 is in a locked state. In this case, it is possible to omit the lefthand groove 51 in the figure. This embodiment is otherwise identical to the preceding embodiment.

Figure 13:
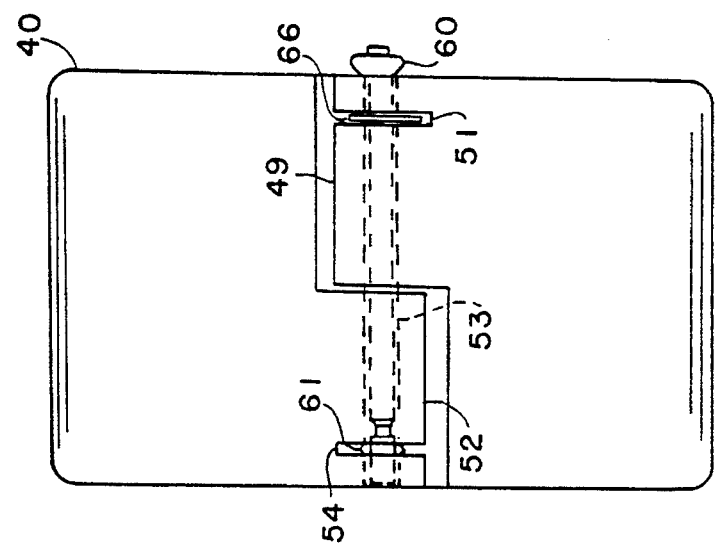

As mentioned above, the hinges 48 of the outer race 40 are not restricted to having a certain number of sockets. FIG. 13 illustrates the outer race 40 of an embodiment in which each hinge has two sockets 49 and 52, while FIG. 14 illustrates the outer race 40 of an embodiment in which each hinge has four sockets 49 and 52.

In the embodiment of FIG. 13, one socket 49 of each hinge has a groove 51 which houses a retaining member 66, while the other socket 52 of the hinge has a similar groove 54 which engages with the detent balls 61 of a hinge pin 60. Groove 54 preferably extends from the external surface of socket 52 to the bore 53 of the socket 52. The outer race 40 is shown in a locked state in FIG. 13. In order to unlock the outer race 40, the hinge pin 60 is retracted, i.e., moved to the right in the figure until its left end is withdrawn from socket 52.

Figure 14:
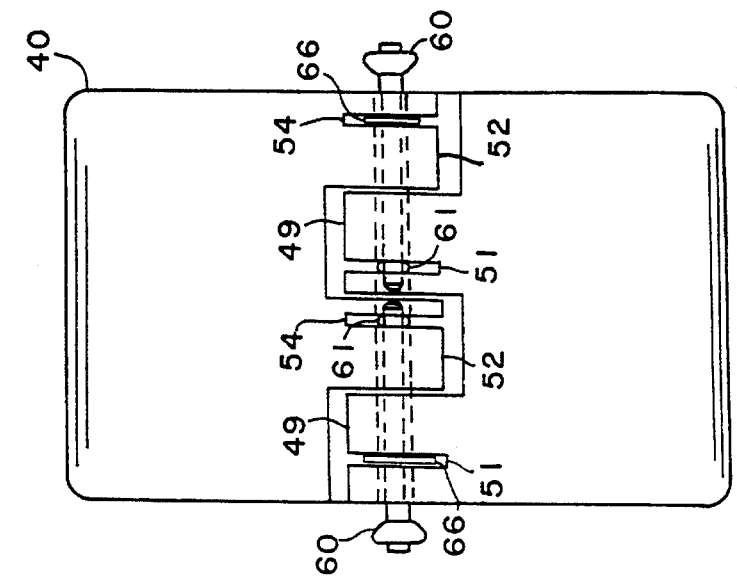
FIGS. 12–14 are side views of the outer races of additional embodiments of the present invention.

In the embodiment of FIG. 14, one section of the outer race 40 has two sockets 49, while the other section of the outer race 40 has two sockets 52 which interfit with sockets 49. A groove 51 is formed in each of sockets 49, and a similar groove 54 is formed in each of sockets 52. Each groove 51 and 54 preferably extends between the external surface of the socket and the inside of the bore of the socket. A single hinge pin may be used to link all four sockets, or as shown in FIG. 14, two hinge pins 60 can be inserted into the sockets from opposite axial ends of the outer race 40. Use of a pair of hinge pins 60 may be advantageous when the axial length of the outer race 40 is particularly large so that a single, long hinge pin 60 would be expensive to manufacture. The grooves 51 and 54 of the inner pair of sockets (the sockets spaced from the axial ends of the outer race 40) engage with the detent balls 61 of the hinge pins 60 when the outer race 40 is in a locked state, while the grooves 51 and 54 of the outer pair of sockets (the sockets adjoining the axial ends of the outer race 40) house retaining members 66. In order to unlock the outer race 40, both hinge pins 60 are retracted in opposite axial directions so that their opposing ends are withdrawn from the inner pair of sockets.

The embodiments of FIGS. 13 and 14 provide the same advantages as the embodiment of FIG. 7.

FIGS. 15–17 illustrate the outer race 40 of another embodiment of a connector according to the present invention. FIG. 15 is a side view of the outer race 40 in a partially assembled state, FIG. 16 shows cross sections of the hinge pin 70 of FIG. 15 at different locations, and FIG. 17 shows the outer race 40 in an assembled state. The overall structure of this embodiment is similar to that of the embodiment of FIG. 4 and it can be used in the same manner as that embodiment. Furthermore, portions of this embodiment which are not shown may be the same as the corresponding portions of the embodiment of FIG. 4. The outer race 40 includes a pair of hinges 48 (only one of which is shown in the figure) which are spaced in the circumferential direction of the outer race 40 and which may be identical in structure. Each hinge 48 includes at least two sockets, each of which is connected to one section 41 of the outer race 40. In this embodiment, each hinge 48 includes a pair of outer sockets 49 formed on one section 41 of the outer race 40 and a pair of inner sockets 52 formed on the other section 41 of the outer race 40 and disposed between the outer sockets 49. Cylindrical bores 53 and 50 are formed in the inner and outer sockets, respectively, for slidably receiving a hinge pin 70. A radial groove 51 is formed in one of the outer sockets 49 between the outer surface and the bore 50, and a retaining member in the form of a retaining ring 66 of metal, plastic, or other suitable material is received in the groove 51 to prevent the complete withdrawal of the hinge pin 70 from the outer socket 49.

The hinge pin 70 of FIG. 15 is similar to the hinge pin 70 of FIG. 6 and includes detent balls 71 at one end and an operating button 72 at the other by means of which the detent balls 71 can be retracted. However, instead of having a constant cross section over substantially its entire length as in the embodiment of FIG. 6, it has a varying cross section, with a region of reduced cross section 74 extending in the axial direction of the hinge pin 70 over a central portion of its length. This region 74 has a constant cross section which is smaller than that of the regions on either end thereof. A wall 76 extending transversely (such as perpendicularly) with respect to the axis of the hinge pin 70 is formed at one end of the region of reduced cross section 74 and extends radially outwards from this region 74. The wall 76 is designed to engage with the retaining ring 66 to prevent complete withdrawal of the hinge pin 70 from the rightmost outer socket 49 and thus serves as a stopping surface. The length of the region of reduced cross section 74 is at least as long as the stroke of the hinge pin 70 between its fully latched position, in which the hinge pin 70 engages all four of the sockets 49 and 52, and an unlatched position in which the hinge pin 70 engages only the outer socket 49 housing the retaining ring 66.

FIGS. 16A and 16B illustrate the cross-sectional shape of the hinge pin 70 at different locations.. FIG. 16A shows the cross section at locations A and C in FIG. 15, outside the region of reduced cross section 74, while FIG. 16B shows the cross section at location B within the region of reduced cross section 74. For simplicity, the hinge pin 70 is illustrated as having a solid cross section, although in reality, the hinge pin 70 has a central bore through which passes an operating rod connected to the operating button 72. At locations A and C, the hinge pin 70 has a completely cylindrical periphery, while in the region of reduced cross section 74, the hinge has a substantially planar flat 75 which reduces the cross section relative to that at location A and forms the transversely extending wall 76. More precisely, in this embodiment, the hinge pin 70 in the region of reduced cross section 74 has a periphery defined by a cylinder intersected by a plane parallel to the axis of the hinge pin 70, the flat 75 being defined by the plane. The cylinder is coaxial with and has the same diameter as the circular cross sections of the hinge pin 70 at locations A or C. The flat 75 spans a central angle (measured from the longitudinal axis of the hinge pin 70) of less than 180° and preferably less than 90°, such as from 45°–90°.

The height of the transverse wall 76, measured from the flat 75 in the radial direction of the hinge pin 70, is not critical and can be any height which enables the wall 76 to reliably catch against the retaining ring 66 when the hinge pin 70 is moved to its unlatched position. In the present embodiment, the height is but a fraction of the overall diameter of the hinge pin 70. The shape of the wall 76 is also not critical, and instead of extending perpendicular to the axis of the hinge pin 70, as in FIG. 15, it may extend at a different angle. For ease of manufacture, a similar transverse wall may be formed at the opposite end of the region of reduced cross section 74 but is not necessary for the operation of the hinge pin 70.

The flat 75 and the wall 76 can be easily formed by machining the surface of a commercially available quick release pin, which has a completely round outer surface as purchased.

In order to assist a user in grasping the hinge pin 70 and depressing the operating button 72, the end of the hinge pin 70 adjoining the operating button 72 may be equipped with a ring 73 or other member which projects radially outward from this portion of the hinge pin 70. To prevent damage to the ring 73 when forces are applied to it, the ring 73 is preferably capable of swiveling about an axis extending transversely to the axis of the hinge pin 70.

The bore 50 in the leftmost outer socket 49 in FIG. 15 is enlarged in diameter, i.e., counterbored along a portion of its length to define an internal wall 50a extending transversely with respect to the axis of the bore 50. When the hinge pin 70 is inserted into this socket 49 to the latched position shown in FIG. 22, the detent balls 71 engage with this wall 50a to resist the removal of the hinge pin 70 from the socket 49 unless the operating button 72 is depressed to permit the detent balls 71 to be retracted. The use of an internal wall 50a to engage the detent balls 71 rather than a groove as in the embodiment of FIG. 7 may be advantageous because it produces less weakening of the socket 49 than does a groove.

The shape of the retaining ring 66 is not important as long as the retaining ring 66 can engage with the wall 76 of the hinge pin 70 and prevent complete withdrawal of the hinge pin 70. In this embodiment, the retaining ring 66 is initially round when installed in the groove 51, but after installation, it is plastically deformed into the shape of a D roughly corresponding to the shape of the outer periphery of the hinge pin 70 in the region of reduced cross section 74. More specifically, when deformed, the retaining ring 66 has a substantially straight portion 66a which extends substantially parallel the flat 75 of the hinge pin 70 and a curved portion 66b which extends along the curved periphery of the hinge pin 70. The material of which the retaining ring 66 is formed is not critical, as long as it has sufficient strength to resist the forces acting on it during use, especially when the hinge pin 70 is pulled with great vigor from its latched to its unlatched position. The retaining ring 66 may be a continuous ring as in this embodiment, or it may be a split ring with ends separated by a gap, such as a C-ring. In this embodiment, the retaining ring 66 completely surrounds the hinge pin 70, but it is instead possible for the ring 66 to extend only part way around the circumference of the hinge pin 70.

FIGS. 18A–18E illustrate a method of installing the retaining ring 66 on the hinge pin 70. First, as shown in FIG. 18A, the undeformed retaining ring 66 is inserted into the groove 51 in one of the outer sockets 49. In the undeformed state as shown in FIG. 18B, the retaining ring 66 is round and has an inner diameter sufficiently large that it can slip over the end of the hinge pin 70 with the detent balls 71 retracted. Alternatively, the inner diameter may be large enough for the retaining ring 66 to slip over the hinge pin 70 without the detent balls 71 being retracted. After the retaining ring 66 is disposed in the groove 51 in the outer socket 49, the hinge pin 70 is inserted axially into the outer socket 49 so that the retaining ring 66 surrounds the region of reduced cross section 74, as shown in FIG. 18C. The appearance of the retaining ring 66 at this time is shown in FIG. 18D. The retaining ring 66 is then plastically deformed into a D-shape, as shown in FIG. 18E, by exerting pressure on the retaining ring 66 in the direction normal to the flat 75. The retaining ring 66 is now shaped so as to be able to engage the wall 76 of the hinge pin 70 and prevent complete withdrawal of the hinge pin 70.

In the deformed shape, the retaining ring 66 preferably fits loosely, i.e., with a non-interference fit around the hinge pin 70 so that the hinge pin 70 can easily slide inside the retaining ring 66 in the axial direction of the hinge pin 70. In addition, the deformed retaining ring 66 preferably does not interfere with the free rotation of the hinge pin 70 about its axis inside the sockets. Thus, in the state shown in FIG. 18E, even though the retaining ring 66 cannot rotate with respect to the hinge pin 70, the retaining ring 66 fits loosely in the groove 51 so that the retaining ring 66 and the hinge pin 70 can rotate together about the axis of the hinge pin 70. If the retaining ring 66 in its deformed shape fits sufficiently loosely around the hinge pin 70, it can be deformed a second time into a shape which enables the hinge pin 70 to be completely withdrawn from the sockets of the hinge 48. As shown in FIG. 18F, for example, if compressive forces having a direction rotated about the axis of the hinge pin 70 by roughly 90° with respect to the forces illustrated in FIG. 18E are applied to the retaining ring 66, the straight portion 66a of the retaining ring 66 opposing the flat 75 can be made to bulge away from the flat 75 so as to no longer block movement of the wall 76 and thereby allow the hinge pin 70 to be completely withdrawn.

The deformed shape of the retaining ring 66 is not restricted to the shape of a D, and any deformed shape which can be maintained by the retaining ring 66 and allows the hinge pin 70 to move axially with respect to the retaining ring 66 while permitting the retaining ring 66 to abut against the wall 76 of the hinge pin 70 can be used.

Figure 19A:
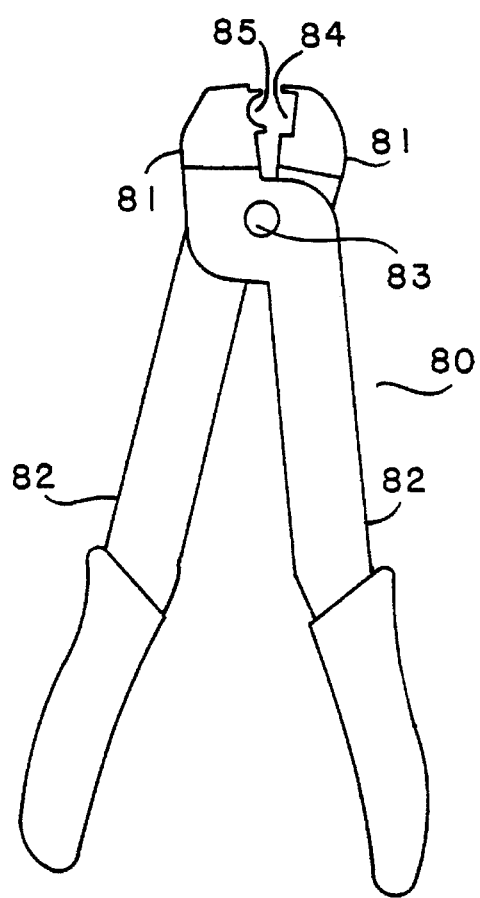
FIGS. 19A and 19B are plan views of a tool for use in the assembly of the embodiment of FIG. 15.
Figure 19B:
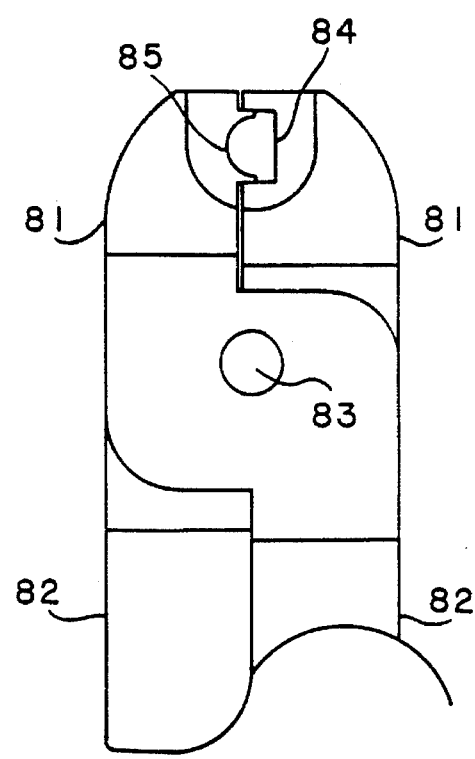

Any appropriate means can be used to deform the retaining ring 66 into the desired shape. FIG. 19 illustrates an example of a tool 80 suitable for use in deforming the retaining ring 66 into the shape of a D. The tool 80 resembles a pair of pliers and has two jaws 81 each secured to a handle 82 and pivotably connected to each other at a pivot point 83. Recesses 84 and 85 for receiving and compressing a retaining ring 66 are formed in opposing surfaces of the two jaws 81. One recess 84 is generally rectangular in shape with a substantially flat bottom and two opposing sides, while the recess 85 in the other jaw 81 is substantially semicircular. The portions of the jaws 81 immediately surrounding the recesses 84 and 85 are sufficiently thin that the jaws 81 can be closed while inserted into the groove 51 in the outer socket 49 which houses the retaining ring 66. In use, the open jaws 81 are placed around an undeformed retaining ring 66 in the groove 51 with the flat, bottom surface of recess 84 opposing and substantially parallel to the flat 75 on the hinge pin 70. The jaws 81 are then closed, clamping the retaining ring 66 within the recesses 84 and 85 and deforming the retaining ring 66 into the shape of a D.

Subsequently, if it is desired to completely remove the hinge pin 70 from the sockets of the hinge 48, the jaws 81 of the tool 80 are placed around the now D-shaped retaining ring 66 with the bottom surface of recess 84 extending substantially perpendicular to the flat 75 on the hinge pin 70. When the jaws 81 are then closed, the retaining ring 66 is deformed in the manner shown in FIG. 18F so that the wall 76 of the hinge pin 70 can pass through the retaining ring 66.

Each hinge 48 of the outer race 40 of FIG. 15 has two inner sockets 52 spaced apart by a gap through which the hinge pin 70 is visible. The two inner sockets 52 may be replaced by a single inner socket, as in the embodiment of FIG. 7, for example. However, the provision of a gap through which the orientation of the flat 75 on the hinge pin 70 is visible makes it easier to align the flat bottom surface of the recess in the jaw 81 with the flat 75 in the hinge pin 70 when deforming the retaining ring 66. Alternatively, if a hinge 48 with a single inner socket 52 like that shown in FIG. 7 is used, a hole or groove can be formed in the inner socket 52 to permit the orientation of the flat 75 to be observed.

Other methods, not using the tool 80 of FIG. 19, can be used to deform the retaining ring 66 into a desired shape, such as by using a punch or a pair of pliers having jaws slender enough to fit into the groove 51 holding the retaining ring 66.

Many different shapes are possible for the region of reduced cross section 74 in addition to the shape shown in FIG. 16B. For example, the hinge pin 70 may have a plurality of flats spaced in the circumferential direction, i.e., the region of reduced cross section may be defined by a cylinder intersected by more than one plane, with each plane defining a flat. Furthermore, instead of the flat 75 being planar, it may be curved inwards or outwards from the longitudinal axis of the hinge pin 70. Thus, as viewed in cross section, the flat 75 may have any shape, with the shape preferably situated inside the periphery of the cylinder defining the region of reduced cross section 74. Alternatively, the region of reduced cross section 74 may have a completely circular periphery concentric with but smaller in diameter than the circular regions at locations A and C in FIG. 15. Whatever the shape of the region of reduced cross section 74, preferably enough of the outer periphery of the hinge pin 70 in this region lies along a cylinder circumscribing the outer surface of the hinge pin 70 that the sections 41 of the outer race 40 can smoothly pivot with respect to each other without a large amount of lateral play between the sockets 49 and 52 and the hinge pin 70.

In this embodiment, the retaining ring 66 is plastically deformed between its undeformed, round state in which it can easily fit over the end of the hinge pin 70 and its deformed, D-shaped state in which it blocks movement of the wall 76 of the hinge pin 70. However, the retaining ring 66 may instead be one which undergoes elastic deformation between a first state in which it blocks movement of the wall 76 to prevent complete withdrawal of the hinge pin 70 from the sockets and a second state in which it permits insertion and withdrawal of the hinge pin 70. For example, the retaining ring 66 may have an elliptical first shape in which it closely engages the flat 75 of the hinge pin 70, and a round second shape which it assumes when elastically deformed by the application of forces along the major axis of the ellipse. In such a case, the retaining ring could be elastically deformed by means of pliers, for example, into the round shape when the hinge pin 70 is being inserted into or completely withdrawn from the sockets, and then the deforming force could be released to allow the retaining ring to assume its elliptical shape preventing complete withdrawal of the hinge pin 70.

Figure 20:
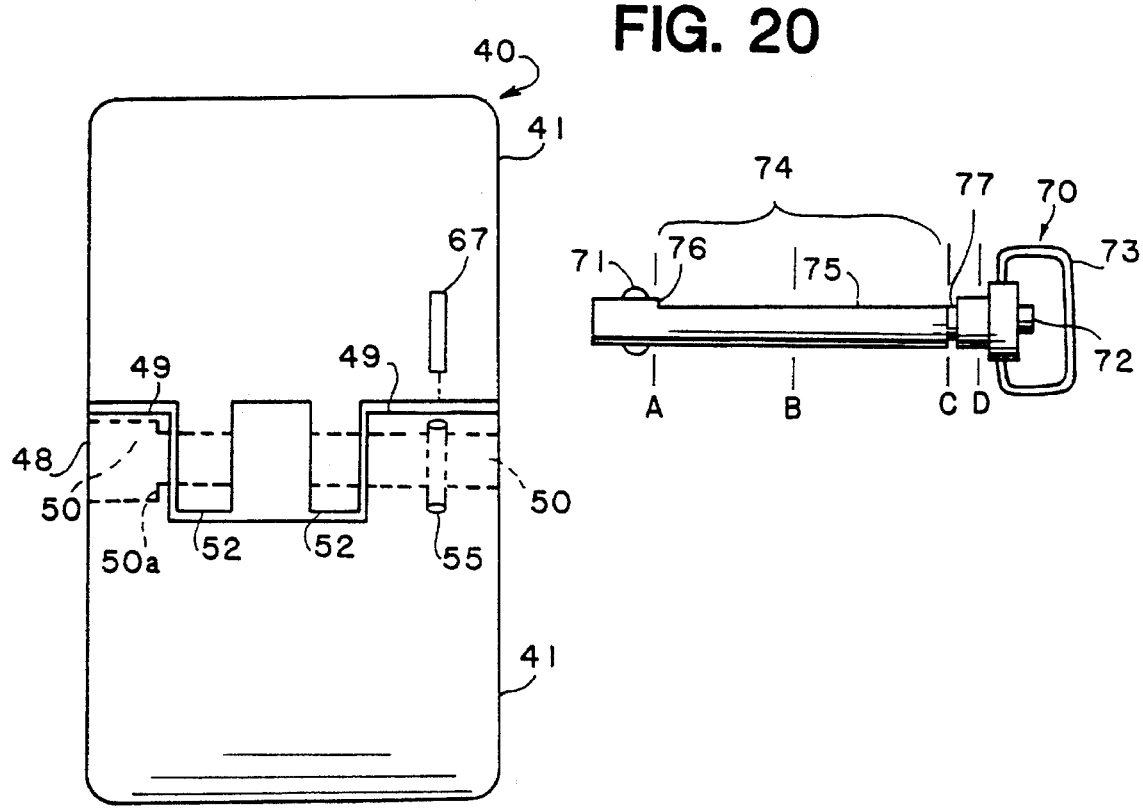
FIG. 20 is a side view of another embodiment of the present invention in a partially assembled state.
Figure 21A:
FIGS. 21A–21C are cross-sectional views of different portions of the hinge pin of the embodiment of FIG. 20.
Figure 21B:
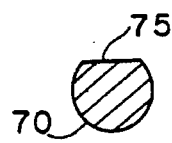
Figure 21C:
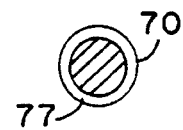
Figure 22:
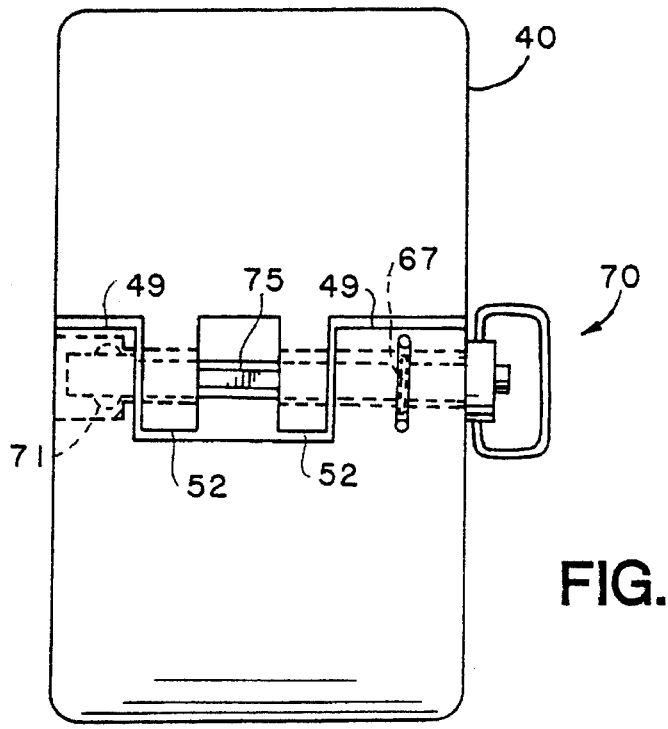
FIG. 22 is a side view of the embodiment of FIG. 20 as assembled.

FIGS. 20–23 illustrate the outer race 40 of another embodiment of a connector according to the present invention. FIG. 20 shows the outer race 40 in a partially assembled state, FIGS. 21A–21C show cross sections at locations A–C of the hinge pin 70 of FIG. 20, and FIG. 22 shows the outer race 40 as assembled. The outer race of this embodiment is similar in overall structure to that of the embodiment of FIG. 15, except that a retaining member for preventing complete withdrawal of the hinge pin 70 from the outer race 40 comprises a retaining pin 67 mounted in a hole 55 in one of the outer sockets 49 and extending into the bore 50 of the socket 49. Like the hinge pin 70 of FIG. 15, the hinge pin 70 of this embodiment has a region of reduced cross section 74 including a substantially planar flat 75 and having a smaller cross section than the region of the hinge pin 70 at location A adjoining the detent balls 71 or at location D near the operating button 72. The circular cross sections at locations A and D, which may be identical in diameter, are shown by FIG. 21A, and the cross section at location B in the region of reduced cross section 74 is shown by FIG. 21B. As in the previous embodiment, the region of reduced cross section 74 has a periphery defined by a cylinder intersected by a plane parallel to the axis of the cylinder, the plane defining the flat 75. The cylinder is coaxial with and has the same diameter as the circular portions of the hinge pin 70 at locations A and D. A stopping surface in the form of a transversely extending wall 76 is formed in the hinge pin 70 at the end of the flat 75 in the vicinity of the detent balls 71. The retaining pin 67 extends far enough into the bore 50 of the outer socket 49 in which it is mounted so as to lie in the path of axial movement of the wall 76 and thereby prevent the hinge pin 70 from being completely withdrawn from the outer socket 49. A circumferentially extending groove 77 is preferably formed in the outer surface of the hinge pin 70 adjoining the end of the flat 75 closest to the operating button 72. When the hinge pin 70 is fully inserted into the sockets of the hinge 48 and the detent balls 71 engage the bore 50 in the leftmost outer socket 49, the groove 77 is aligned with the retaining pin 67. The groove 77 has a depth such that when the groove 77 and the retaining pin 67 are aligned, the hinge pin 70 can freely rotate about its axis in response to applied forces. When the hinge pin 70 is moved axially from this position so that the retaining pin 67 and the groove 77 are no longer aligned, the hinge pin 70 is prevented from rotating about its axis by the retaining pin 67. The unillustrated hinge 48 on the opposite side of the outer race 40 may have the same structure as the illustrated hinge 48.

Figure 23A:
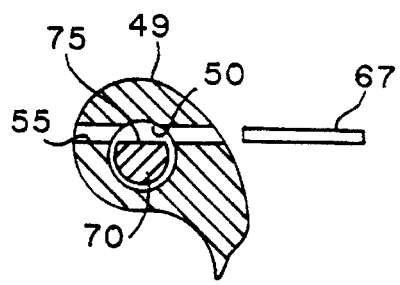
FIGS. 23A–23C are cross-sectional views of one of the outer sockets of the embodiment of FIG. 20.
Figure 23C:
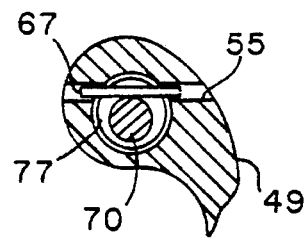
Figure 23B:
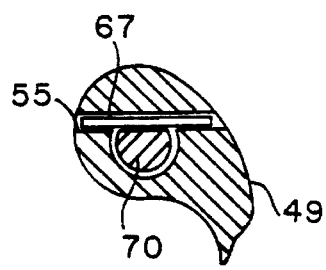

In order to assemble the outer race 40 in the manner shown in FIG. 22, with the retaining pin 67 removed, the hinge pin 70 is inserted into the rightmost outer socket 49 in FIG. 20 until the flat 75 or the groove 77 in the hinge pin 70 is aligned with the hole 55 for the retaining pin 67. This state is shown in FIG. 23A, which is a cross-sectional view of the outer socket 49 along a plane passing through the hole 55 for the retaining pin 67. The retaining pin 67 is then inserted into the hole 55 and across the bore 50 in the outer socket 49, as shown in FIG. 23B. In this state, the retaining pin 67 may be either spaced from or contacting the flat 75, but any contact is preferably light enough that the hinge pin 70 can easily slide in the axial direction within the sockets with little friction between the flat 75 and the retaining pin 67. The retaining pin 67 is preferably secured within the hole 55 to prevent it from falling out, such as by an interference fit between the retaining pin 67 and the hole 55. For example, the retaining pin 67 may be a roll pin which must be compressed in order to fit into the hole 55. In the state shown in FIG. 23B, the hinge pin 70 is prevented from rotation by the retaining pin 67. FIG. 23C illustrates the state in which the hinge pin 70 is fully inserted into the sockets 49 and 52 and the groove 77 in the hinge pin 70 is aligned with the retaining pin 67. In this state, the hinge pin 70 can be rotated about its axis.

In order to partially withdraw the hinge pin 70 from the sockets, the hinge pin 70 must be rotated to a position such that the flat 75 on the hinge pin 70 is substantially parallel to the retaining pin 67, as in FIG. 23B. For this reason, the hinge sockets 49 and 52 are preferably structured such that the orientation of the flat 75 is visible. For example, as shown in FIG. 20, the hinge 48 may include two inner sockets 52 spaced by a gap.

In FIG. 20, the hinge pin 70 is formed with a single flat 75. Alternatively, it may be formed with a plurality of flats so that the hinge pin 70 can be retracted when in a plurality of rotational positions. In this case, the periphery of the region of reduced cross section 74 is defined by a cylinder intersected by a plurality of planes, each plane defining one of the flats 75.

The retractable hinge pins disclosed in the above-described embodiments are not restricted to use in hinges for underwater cables, nor are they restricted to use with hinges. They can be employed as connecting pins in any type of connector for connecting two members in which it is desired to be able to retract the connecting pin to permit disconnection of the members from each other without the connecting pin being completely detached from the connector. For example, it could be used as a clevis pin, as a general purpose latch pin, as a connecting pin for a trailer hitch, as a detachable pin for connecting links of a chain, or as a connecting pin for a universal joint. It is particularly suitable for use in severe environments, such as on the deck of a ship where a loose pin could be easily dropped and washed overboard.

What is claimed is:

1. A connector for connecting equipment to an underwater cable comprising:

a first collar having a bore for receiving an underwater cable and comprising first and second sections;

a first hinge pivotably connecting the first and second sections; and a latch mechanism spaced from the hinge in a circumferential direction of the first collar and including a retaining member and a latching pin, the latching pin being supported by the first collar for movement in an axial direction of the latching pin between a latched position in which the latching pin engages both sections of the first collar and an unlatched position in which the latching pin is withdrawn from one of the sections of the first collar, the latching pin having a first region with an axial length of at least approximately a stroke of the latching pin between the latched and unlatched positions and a stopping surface disposed at an end of the first region, the first region having an outer periphery defined by a cylinder with a flat formed thereon, the retaining member being disposed to engage with the stopping surface to block axial movement of the latching pin and prevent complete detachment of the latching pin from the first collar.

2. A connector according to claim 1 wherein the first region has an outer periphery defined by the cylinder intersected by a plane parallel to a longitudinal axis of the cylinder, the plane defining the flat.

3. A connector according to claim 1 wherein the flat spans a central angle of less than 180° measured from a longitudinal axis of the cylinder.

4. A connector according to claim 1 wherein the flat spans a central angle of less than 90° measured from a longitudinal axis of the cylinder.

5. A connector according to claim 1 wherein the latch mechanism comprises a second hinge and the latching pin comprises a hinge pin of the second hinge.

6. A connector according to claim 1 including a second collar having a bore for receiving an underwater cable, the first collar being rotatably mounted around the second collar.

7. A connector according to claim 1 wherein the retaining member comprises a ring at least partially surrounding the first region.

8. A connector according to claim 7 wherein the ring extends completely around the first region.

9. A connector according to claim 7 wherein there is a non-interference fit between the ring and the first region of the latching pin.

10. A connector according to claim 7 wherein the ring has an inner periphery substantially similar in shape to the outer periphery of the first region.

11. A connector according to claim 10 wherein the ring has a substantially D-shaped inner periphery.

12. A connector according to claim 1 wherein the retaining member comprises a retaining pin opposing the flat.

13. A connector according to claim 12 wherein the retaining pin extends across the flat in a transverse direction with respect to a longitudinal axis of the cylinder.

14. A connector according to claim 1 wherein the latching pin includes a second region adjoining the first region and having a cylindrical outer periphery, the stopping surface being formed between the first and second regions.

15. A connector according to claim 1 wherein the stopping surface comprises a wall extending radially outward from an end of the first region.

16. A connector for connecting equipment to an underwater cable comprising:

a collar having a bore for receiving an underwater cable and comprising first and second sections; and a hinge pivotably connecting the first and second sections, the hinge comprising a first socket connected to the first section, a second socket connected to the second section, a hinge pin supported by the first socket for movement in an axial direction of the hinge pin between a latched position in which the hinge pin engages both sockets and an unlatched position in which the hinge pin is withdrawn from the second socket, the hinge pin having a stopping surface formed thereon, and a retaining ring mounted on the first socket and at least partially surrounding the hinge pin with a non-interference fit and disposed to engage with the stopping surface to block axial movement of the hinge pin and prevent complete detachment of the hinge pin from the first socket.

17. A connector for connecting equipment to an underwater cable comprising:

a collar having a bore for receiving an underwater cable and comprising first and second sections;

a latching member supported by the collar for movement in an axial direction of the latching member between a latched position in which the latching member engages both sections of the collar and an unlatched position in which the latching member is withdrawn from one of the sections of the collar, the latching member having a first region with an axial length of at least approximately a stroke of the latching member between the latched and unlatched positions, a second region adjoining the first region and having a larger transverse cross sectional area than the first region, and a stopping surface formed between the first and second regions; and a retaining member mounted on the collar and disposed to engage with the stopping surface to block axial movement of the latching member and prevent complete detachment of the latching member from the collar.

18. A connector for connecting equipment to an underwater cable comprising:

a collar having a bore for receiving an underwater cable and comprising first and second sections;

a pin supported by the collar for movement in an axial direction of the pin between a latched position in which the pin engages both sections of the collar and an unlatched position in which the pin is withdrawn from one of the sections of the collar, the pin having a first region with an axial length of at least approximately a stroke of the pin between the latched and unlatched positions and a wall formed at an end of the first region and extending radially outward from the first region, the first region having an outer periphery defined by a cylinder intersected by a plane; and a retaining member mounted on the collar and disposed to engage with the wall to block axial movement of the pin and prevent complete detachment of the pin from the collar.

19. A connector for detachably connecting first and second members comprising:

a first connecting portion attached to the first member;

a second connecting portion attached to the second member;

a connecting pin supported by one of the first and second connecting portions for movement in an axial direction of the connecting pin between a latched position in which the connecting pin engages both connecting portions and an unlatched position in which the connecting pin is withdrawn from one of the connecting portions, the connecting pin having a first region with an axial length of at least approximately a stroke of the connecting pin between the latched and unlatched positions and a stopping surface disposed at an end of the first region, the first region having an outer periphery defined by a cylinder having a flat formed thereon; and a retaining member mounted on the first member and disposed to engage with the stopping surface to block axial movement of the connecting pin and prevent complete detachment of the connecting pin from the first member.

20. A connector according to claim 19 wherein the flat is defined by a plane intersecting the cylinder and extending parallel to a longitudinal axis of the cylinder.

21. A connector according to claim 19 wherein the retaining member comprises a ring at least partially surrounding the first region with a non-interference fit.

22. A connector according to claim 21 wherein the ring has an inner periphery substantially similar in shape to the outer periphery of the first region.

23. A connector according to claim 19 wherein the retaining member comprises a retaining pin.

24. A method of connecting first and second members with a pin comprising:

mounting a retaining ring on a socket of a first member with a bore of the retaining ring coinciding with a bore of the first socket;

aligning a bore of a second socket of the second member with the bore of the first socket;

inserting a pin having a stopping surface thereon through the bore of the retaining ring and the bores of the first and second sockets; and then plastically deforming the retaining ring such that a portion of the retaining ring blocks axial movement of the stopping surface.

25. A method according to claim 24 wherein deforming the retaining ring comprises forming a loose fit between the retaining ring and the pin.

* * * * *